US010868951B2

(12) United States Patent
Zima et al.

(10) Patent No.: US 10,868,951 B2
(45) Date of Patent: Dec. 15, 2020

(54) SYSTEM AND SOFTWARE FOR EXCHANGING DATA BETWEEN MOBILE CELLULAR DEVICES TO CREATE A COORDINATED COMMUNAL RESPONSE

(71) Applicants: Brian Zima, Miami Beach, FL (US); Seth Damergy, Hoboken, NJ (US)

(72) Inventors: Brian Zima, Miami Beach, FL (US); Seth Damergy, Hoboken, NJ (US)

(*) Notice: Subject to any disclaimer, the term of this patent is extended or adjusted under 35 U.S.C. 154(b) by 58 days.

(21) Appl. No.: 16/255,785

(22) Filed: Jan. 23, 2019

(65) Prior Publication Data

US 2019/0158757 A1 May 23, 2019

Related U.S. Application Data

(63) Continuation-in-part of application No. 15/340,967, filed on Nov. 1, 2016, now abandoned.

(60) Provisional application No. 62/249,908, filed on Nov. 2, 2015.

(51) Int. Cl.
| | |
|---|---|
| H04W 56/00 | (2009.01) |
| H04N 5/232 | (2006.01) |
| G03B 15/05 | (2006.01) |
| H04N 5/225 | (2006.01) |
| H04W 84/20 | (2009.01) |

(52) U.S. Cl.
CPC ....... *H04N 5/232061* (2018.08); *G03B 15/05* (2013.01); *H04N 5/2256* (2013.01); *H04W 56/002* (2013.01); *G03B 2215/0557* (2013.01); *H04W 84/20* (2013.01)

(58) Field of Classification Search
CPC ...... H04L 67/22; H04W 4/08; H04W 56/002; G03B 15/05
See application file for complete search history.

(56) References Cited

U.S. PATENT DOCUMENTS

| | | | |
|---|---|---|---|
| 5,273,437 | A | 12/1993 | Caldwell et al. |
| 6,965,785 | B2 | 11/2005 | Mager et al. |
| 7,082,402 | B2 | 7/2006 | Conmy |
| 7,123,930 | B2 | 10/2006 | inselberg |
| 7,697,925 | B1 | 4/2010 | Wilson et al. |
| 8,391,773 | B2 | 3/2013 | Arseneau et al. |
| 2003/0017823 | A1 | 1/2003 | Mager |
| 2008/0228498 | A1 | 9/2008 | Gasque |
| 2009/0315737 | A1* | 12/2009 | Gilmour ............. G07F 17/0057 340/932.2 |
| 2012/0165100 | A1 | 6/2012 | Lalancette |
| 2012/0184304 | A1 | 7/2012 | Walsh et al. |
| 2012/0269360 | A1 | 10/2012 | Burke |

(Continued)

*Primary Examiner* — Mansour Oveissi
(74) *Attorney, Agent, or Firm* — LaMorte & Associates, P.C.

(57) ABSTRACT

The present invention is a system and method of operating cellular devices in a synchronized manner. Each of a plurality of mobile cellular devices has a system clock, a display screen, and a camera flash, and each mobile cellular device communicates with a communications network. A software application is loaded onto each of the cellular devices. A primary user selects a session activity that is to be performed by the cellular devices. The cellular devices first update system time to improve time synchronization. At an execution time, a session activity is performed simultaneously by all the mobile cellular devices.

13 Claims, 6 Drawing Sheets

(56) References Cited

U.S. PATENT DOCUMENTS

| | | | |
|---|---|---|---|
| 2012/0270576 A1* | 10/2012 | Herrington | H04N 21/43637 455/466 |
| 2013/0109364 A1 | 5/2013 | Mercuri et al. | |
| 2013/0244632 A1* | 9/2013 | Spence | H04M 3/5231 455/415 |
| 2014/0129946 A1 | 5/2014 | Harris et al. | |
| 2015/0079962 A1* | 3/2015 | Baker | H04W 4/023 455/418 |
| 2016/0375340 A1* | 12/2016 | Monari | G06F 3/147 345/474 |

* cited by examiner

SYSTEM AND SOFTWARE FOR EXCHANGING DATA BETWEEN MOBILE CELLULAR DEVICES TO CREATE A COORDINATED COMMUNAL RESPONSE

RELATED APPLICATIONS

This application is a continuation-in-part of co-pending U.S. patent application Ser. No. 15/340,967, filed Nov. 1, 2016, that claims the benefit of U.S. Provisional Patent Application No. 62/249,908 filed Nov. 2, 2015.

BACKGROUND OF THE INVENTION

1. Field of the Invention

In general, the present invention relates to systems and software that enable a single person to communicate with multiple cell phones in a daisy chain progression.

2. Prior Art Description

It is very easy to synchronize the movements and actions of just a few people. For instance, it is easy to get a few people to clap together in unison. However, trouble occurs when attempts are made to synchronize large numbers of people. For instance, it is nearly impossible for get a stadium filled with people to clap in unison. This is because each person in the stadium may hear the direction to clap at a slightly different time, due to transmission delays. People also hear other people clap who are far enough away that the sound is delayed by the distance the sound travels. Furthermore, some people have faster reaction times than do other people and may clap at a different rate. Each of these circumstances causes a slight difference in a person's reaction time. These slight delays in reactions cause different parts of a crowd to quickly fall out of synchronization. Therefore, after only a few claps, any attempt at synchronization is lost to random applause.

The same problems occur when a person attempts to coordinate a crowd using messages that are broadcast over a communications network. Different people have different phones with different clock settings and networks that send data at different rates. As such, any attempt to synchronize a crowd of people using instructions sent to the phones of the individuals in the crowd are destined to be out of synchronization.

In the prior art, attempts have been made to provide better synchronization to multiple cell phones. For example, in U.S. Patent Application Publication No. 2012/0165100 to Lalancette, a system is disclosed where activities are synchronized at the server. This helps somewhat. However, different cell phones access the synchronized server in different ways, using different cellular providers and transmitting to different cell towers at different distances from the cell towers. The result is a difference in synchronization at each phone as great as a few seconds.

In U.S. Pat. No. 7,697,925 to Wilson, a cell phone display system is disclosed that causes different cell phones to run software commands at the same chronological time. For example, all of the cell phones can be made to have a white screen at exactly 12 noon. This eliminates delays caused by data transmission. However, the problem is that each cell phone participating does not have its internal clock synchronized with the other phones in the system. As a result, the internal clock of the phone can often be a fraction of a second different from the internal clock of other phones. The difference in internal time may be as great as two seconds.

Having phones synchronized to less than one second may be fine for coordinating the singing of a song. However, such an error in synchronization is very troublesome in other applications. Suppose a person is trying to get cell phones to all flash at the exact same time. The flash of a cell phone camera only lasts a fraction of a second. If the phones are out of synchronization by a fraction of a second, the result is that all the phones will not flash at the exact same moment in time. Rather, some phones will flash slightly early and some phones will flash slightly late. The result is one long flash rather than one intense short flash. The same problem occurs when a large crowd claps, chants, or cheers in unison. A flaw in synchronization of only a fraction of a second will create a cumulative delay that will act to quickly disrupt any synchronization that may exist.

The need for exact synchronization between cell phones becomes even more important if the action being attempted has a change cycle of less than one second. For example, suppose a grouping of cell phones are being used as pixels to create a much larger overall display in a crowd of cell phone users. By synchronizing the displays, the image can be manipulated in a controlled manner. However, if the cell phone synchronization is off by only a fraction of a second, the integrity of the overall image is compromised.

In the prior art, attempts have been made to coordinate all of the mobile phones in a confined area, such as in a stadium. This is done using the available cellular phone network. Such prior art systems are exemplified by U.S. Patent Application No. 2003/0017823 to Mager. The problem is that in order to use this system, a data link must be created between all the participating cell phones and the cell phone network. In a stadium, there are thousands of people. In a large stadium, the number of people can surpass one-hundred thousand. If this many people attempted to connect to the available cell phone network at the same moment, either the network would crash or only a very small percentage of people in the stadium would be able to obtain and maintain the connection. As a consequence, it is not realistic to believe that tens of thousands of people can be reliably linked by a cell phone network in a confined area at the exact same moment.

A need therefore exists for a system and method that can be used to synchronize and control a large number of mobile cellular devices in a confined area without overwhelming the local area network. In this manner, actions can be coordinated among all the mobile cellular devices in a confined area without concerns of network capacity. This need is met by the present invention as described and claimed below.

SUMMARY OF THE INVENTION

The present invention is a chain network system for executing commands in a synchronized manner across a plurality of mobile cellular devices. A plurality of mobile cellular devices are provided that each run a common software application. The common software application causes each of the mobile cellular devices to generate local personal data networks. The local personal data networks interlink and form a daisy chain network.

The primary mobile cellular device receives the executing commands and disseminates the executing demands to at least one secondary mobile device through the daisy chain network. Each of the plurality of mobile cellular devices has a system clock, a display screen, a camera flash, and exchange data with a communications network. A software application is loaded onto each of the mobile cellular devices that provides a session activity that is to be performed by a plurality of mobile cellular devices during an event.

The software application is run by the mobile cellular devices. Upon running the software application, each of the mobile cellular devices first updates its system time through the communications network. This creates improved time synchronization between each system clock in the plurality of mobile cellular devices. The software application enables each of the users to agree to participate in the session activity and become part of the daisy chain network. The software application enables the primary cellular device to set an execution time for the session activity elected.

At the execution time, the session activity is performed simultaneously by all the mobile cellular devices that are operated by users in the daisy chain network.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system and software can be embodied in many ways to conduct a wide array of actions, only a few such actions have been selected for illustration and discussion. The illustrated embodiment is merely exemplary and should not be considered a limitation when interpreting the scope of the appended claims.

Figure 1:
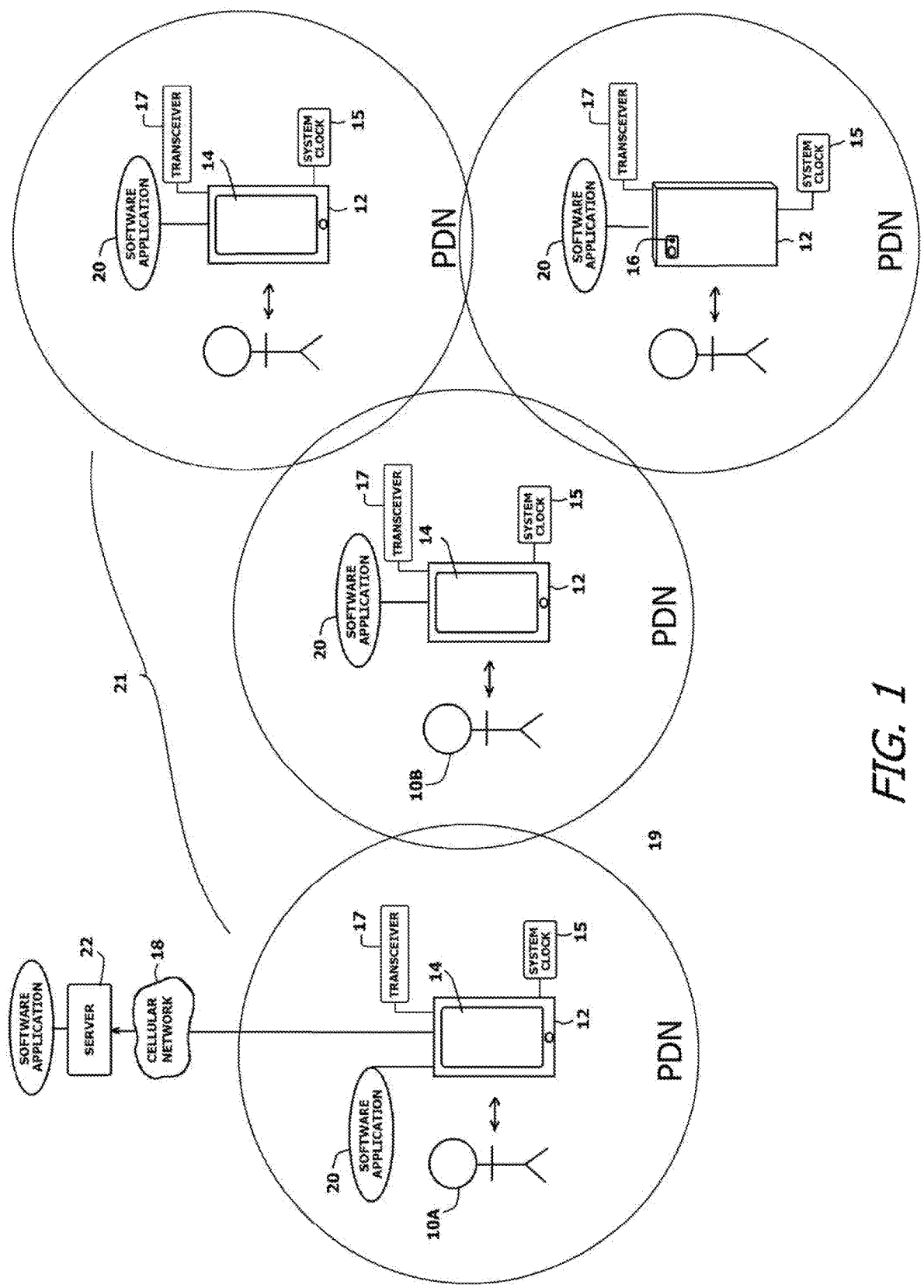
FIG. 1 is a schematic showing the requirements of the present invention system and software.

Referring to FIG. 1, the system requirements of the present invention system and software are disclosed. The system and software are run by system users 10A, 10B. Each member of the system users 10A, 10B has a mobile cellular device 12. The mobile cellular device 12 is preferably a smart phone that has a display screen 14 and an integrated camera with a flash 16. Furthermore, each mobile cellular device 12 is built with an internal system clock 15 and a UHF transceiver 17. The UHF transceiver 17 enables each mobile cellular device 12 to send and receive radio signals, such as Bluetooth® signals. The UHF transceiver 17 enables each of the mobile cellular devices 12 to generate a local personal data network (PDN) 19. In a stadium, a concert, or some other densely attended event, dozens of other people may be within the PDN 19 of any particular mobile cellular device 12.

It will therefore be understood that a daisy chain network 21 can be created from a group of system users 10A, 10B with mobile cellular devices 12. The daisy chain network 21 will include primary system users 10A, who directly connect to the available cellular network 18 and secondary system users 10B that can network with the primary users 10A via the PDNs 19 of the primary users 10A. The secondary users 10B also include all subsequent downstream users that network with the first level of secondary users 10B, via PDNs 19 of the secondary users 10B. This daisy chain network 21 can encompass thousands of people in a confined space with only one, or a few, primary users 10A being actively connected to the cellular network 18. In this manner, software or software instructions can be disseminated among dozens, hundreds, or even thousands of users without overwhelming a local cellular network.

Depending upon the use history, the system clocks 15 of various mobile cellular devices 12 are typically off by a significant fraction of a second and may be off by up to two seconds. Each system user 10A, 10B has a cellular service provider that enables the mobile cellular device 12 to send and receive data over a particular cellular network 18. Prior to a scheduled event, each system user 10A, 10B downloads a software application 20. The software application 20 enables any system user 10A, 10B to transmit and coordinate an executable program to every participating user in the daisy chain network 21, as will be explained. The executable programs are received by the primary users 10A and the secondary users 10B in an unsynchronized manner, due to the progression delays inherent in the daisy chain network 21.

Each internal system clock 15 in each of the mobile cellular devices 12 maintains a system time. In computer programming, system time represents the internal clock used by the computer system to measure the passing of time. System time is measured by the system clock 15, which is typically implemented as a simple count of the number of ticks that have transpired since some arbitrary starting point. The starting point is called the epoch. Different mobile cellular devices use different epochs. For example, Unix® and POSIX® compliant systems encode system time ("Unix time") as the number of seconds elapsed since the start of the Unix® epoch at 1 Jan. 1970 00:00:00, with exceptions for leap seconds. Systems that implement the 32-bit and 64-bit versions of the Windows® API, such as Windows® 9× and Windows® NT, provide the system time as both SYSTEMTIME, represented as a year/month/day/hour/minute/second/milliseconds value, since 1 Jan. 1601 00:00:00. Most iPhones® by Apple® use an epoch of 1 Jan. 1904, represented as a year/month/day/hour/minute/second/milliseconds value.

When a computer system first starts, it sets the system time to a value based on the real-time clock of the computer. The system time is regularly updated, such as each time the mobile cellular device 12 is powered on from a powered-off condition. However, many users rarely power off their mobile cellular devices 12. The clock circuitry within a mobile cellular device 12 therefore keeps the time between updates. Due to variations in the clock circuitry, errors in time occur. The errors in time are usually small, such as a fraction of a second per day. However, after only a short prior of time, two mobile cellular devices can have internal times that differ by one or two seconds. Errors in time accounting accumulate between updates. In the present system, the mobile cellular devices 12 are programmed with a "GetSystemTime" function. When the mobile cellular device 12 is powered on, it searches for networks and runs the GetSystemTime function. When the GetSystemTime function is activated, the mobile cellular device 12 will communicate with a remote SYSTEMTIME structure that contains the current time in milliseconds for the epoch being used. The internal system clock 15 is then updated.

Figure 2:
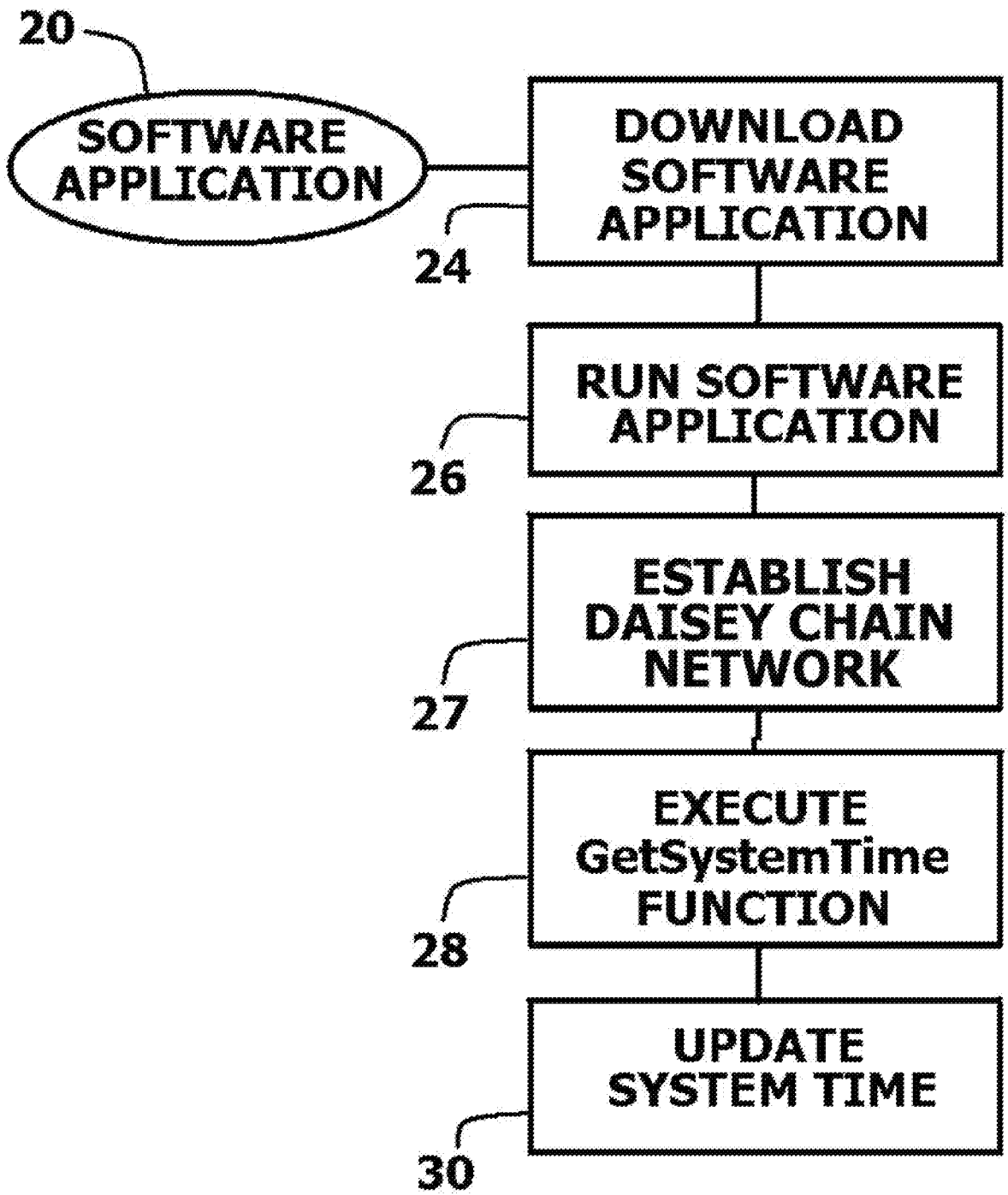
FIG. 2 is a block diagram showing the program methodology used to update system times in participating mobile cellular devices.

Referring to FIG. 2 in conjunction with FIG. 1, it will be understood that prior to an event, the system users 10A, 10B download the software application 20 from a remote server 22. See Block 24. At an event, the system users 10A, 10B can run the software application 20. When running, the software application 20 first sets up a PDN 19 using the UHF transceiver 17 and a transmission protocol, such as Bluetooth®. The PDNs 19 from different users identify and interlink to form the daisy chain network 21. See Block 27. Any user linked into the daisy chain network 21 can become a primary user 10A, as is later explained. The secondary users 10B run the previously loaded software application 20 using the instructions received through the PDN 19 of the primary user 10A. The software application 20 automatically executes a GetSystemTime function. See Block 28. This causes each of the mobile cellular devices 12 linked in the daisy chain network 21 to update its system time. See Block 30. Although the mobile cellular devices 12 may be different makes and models and may use different system time epochs, the updated system time for cellular networks are maintained on remote atomic clocks and will only vary by a few milliseconds, if at all. Accordingly, all of the mobile cellular devices 12 that are running the software application 10 have system clocks 15 that are synchronized to within a few milliseconds. This is well within the operational parameters needed for the software application 20 to operate correctly.

Figure 3:
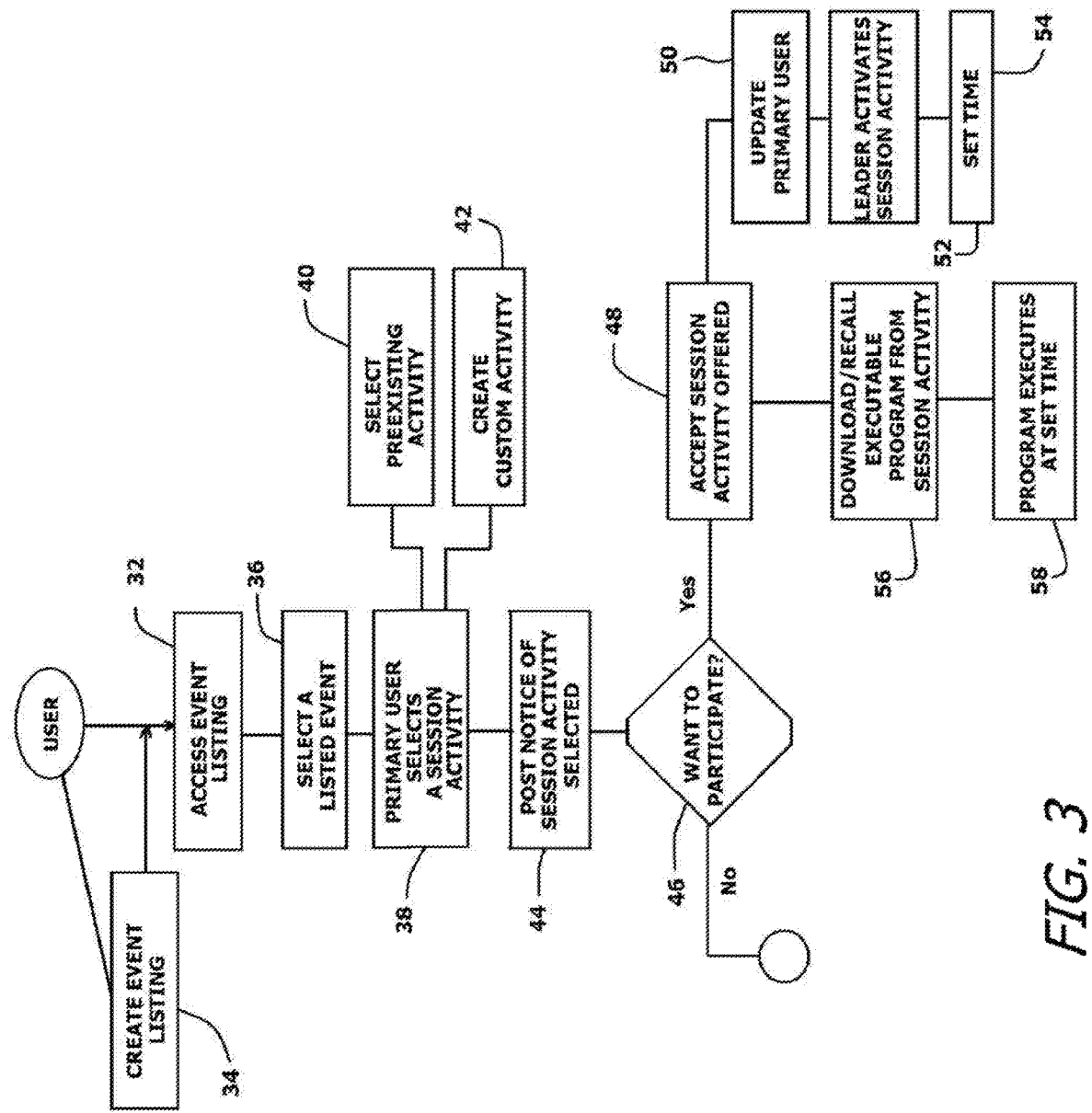
FIG. 3 is a block diagram showing the methodology of the present invention system.

Referring to FIG. 3 in conjunction with FIG. 1, it can be seen that any system user 10A, 10B linked into the daisy chain network 21 can create and post a crowd activity for a listed event. First, a system user 10A, 10B accesses a menu of listed events. See Block 32. If an event is a popular event such as a professional or collegic sporting event, then the event may be downloaded from the server 22 and listed. The server 22 can retrieve the event information from a team website or public schedule. If the event to be listed is a small affair, such as a child's soccer game, then the event listing is created by a system user 10A, 10B. Once the event is created, the event is listed. See Block 34. Preferably, the events are not listed together. Rather, events are listed by areas of interest on various virtual billboards. In this manner, the event listing is easily found by system users 10A, 10B with the same interests who would visit that billboard. For example, in the case of a little league team, a billboard would be created for that little league team, so parents and siblings can find the listings for that team in an efficient manner.

The system users 10A, 10B select a listed event. See Block 36. Once a system user 10A, 10B is running the software application 20 and selects a listed event, the system user 10 is considered part of the available user pool for that event. Thus, the user pool can be a few people for small listed events or many thousands of people for large popular events. Any one of the users in the event user pool can become a primary user 10A. To become a primary user 10A, a user, or a group of users, selects a session activity. See Block 38. The session activity can be selected from a menu of preexisting session activities. See Block 40. Alternatively, the session activity can be a custom session activity designed and built by a system user. See Block 42. The session activity is an activity that is accomplished using the display screen 14, flash 16 and/or internal vibrator of the mobile cellular devices 12. The session activity can be a running display of a cheer, a chant, or a song. The session activity can be a series of screen images, a series of light flashes, the playing of audio, and/or a series of phone vibrations.

Once a primary user 10A or a group of primary users 10A selects a session activity, each of the secondary users 10B in the user pool gets a notice that a session activity has been posted. See Block 44. The secondary users 10B in the user pool are provided with enough information so they can determine what type of session activity has been offered by a particular leader or leadership group acting as a primary user. The secondary users 10B in the user pool can ignore the notice if they do not want to participate in the offered session activity. See Block 46. If a secondary user 10B wants to participate, the secondary user 10B accepts the offered session activity. See Block 48.

The primary user 10A who posted the session activity is updated and can see how many secondary users 10B from the user pool are prepared to participate. See Block 50. If enough secondary users 10B are participating, then the primary user 10A, can activate the session activity. See Block 52.

Once a session activity is activated, a time is selected to start the session activity. See Block 54. That time can be seconds, minutes or hours in the future, depending upon the event, the session activity and the circumstances. Additional secondary users 10B from the user pool are free to join the participants of the session activity at any time.

As a secondary user 10B joins the session activity, the details for the execution of the crowd event are automatically downloaded to that user's mobile cellular device 12 via the daisy chain network 21 or are recalled from a memory within the mobile cellular device 12. See Block 56. Each of the secondary users 10B who selected to participate now has a timed synchronized device, an executable session activity program ready to run, and an exact time to start the session activity program.

Once the selected time for the session arrives, the executable programs on each of participating user's mobile cellular devices 12 start in near perfect time synchronization. See Block 58. Accordingly, the mobile cellular devices 12 will, change color, flash, vibrate and/or broadcast sound in a synchronized manner. Any slight error in synchronization will be so slight as to be incomprehensible by the eyes and/or ears of the system users 10A, 10B. The simultaneous execution enables the mobile cellular devices 12 to achieve effects that previously were unobtainable.

Figure 4:
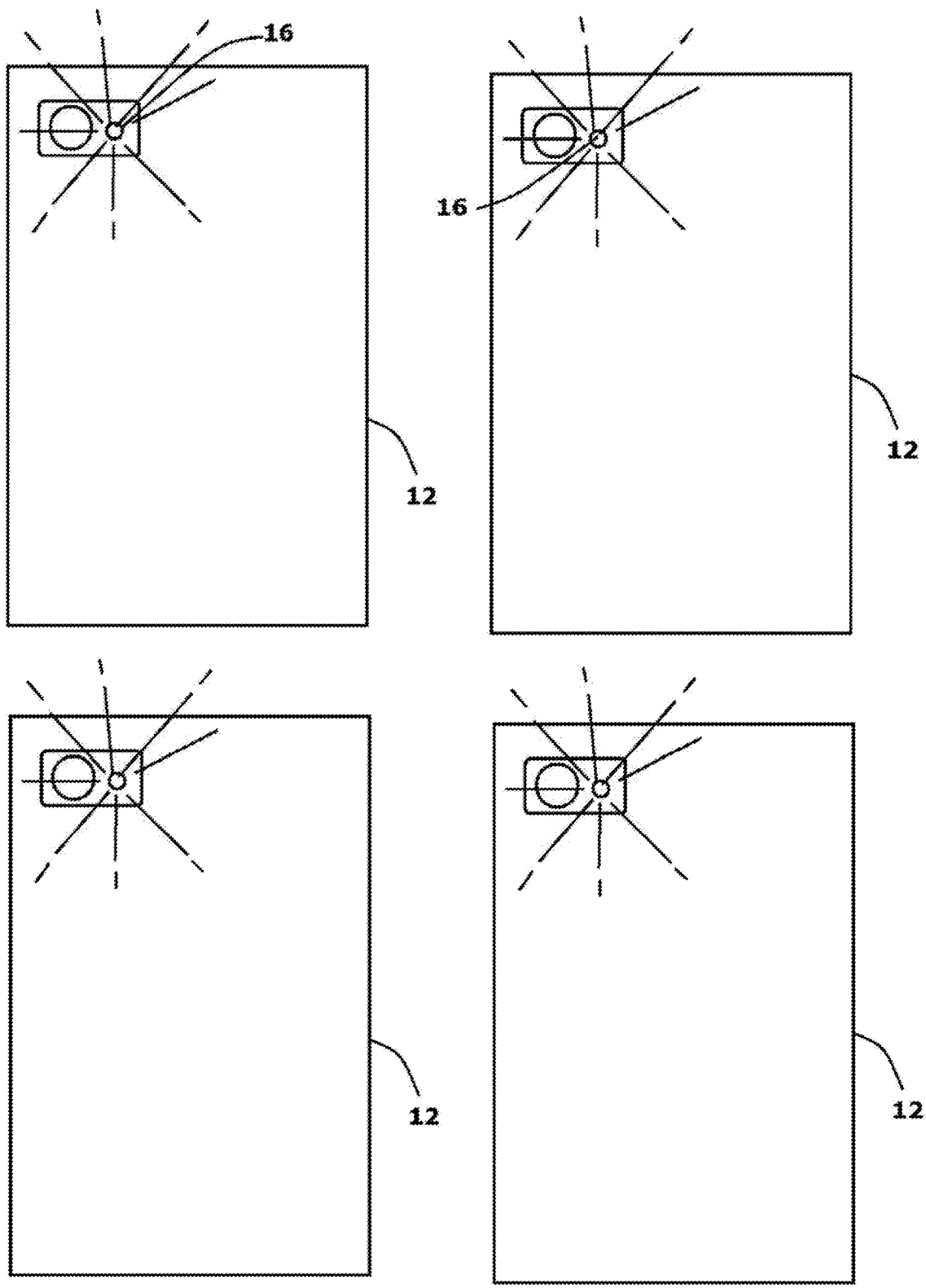
FIG. 4 shows an array of four cell phones flashing in unison.

Referring to FIG. 4 in conjunction with FIG. 1, it can be seen that a person can send an executable command to all the mobile cellular devices 12 in the participating group of users 10 to operate the camera flash 16 of each mobile cellular device 12 at the exact same instance. This would create a gigantic flash in a stadium or other such communal gathering. Likewise, the flashes 16 of the mobile cellular devices 12 can be flashed in a propagating sequence, to create an orchestrated light show within the participating system users 10.

Figure 5:
FIG. 5 shows an array of four cell phones creating different parts of a single image.
Figure 5:
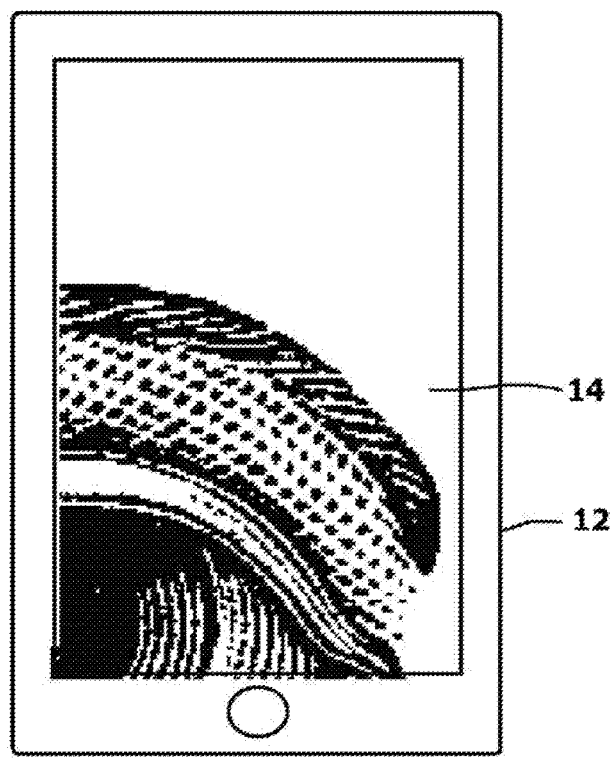
Figure 5:
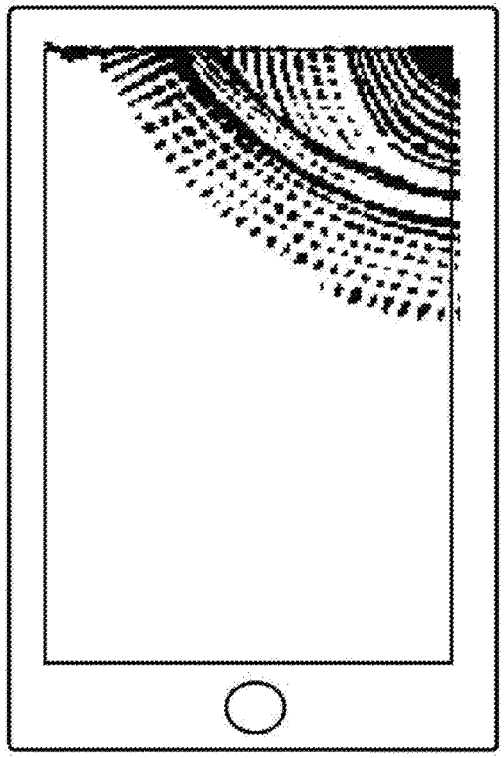
Figure 5:
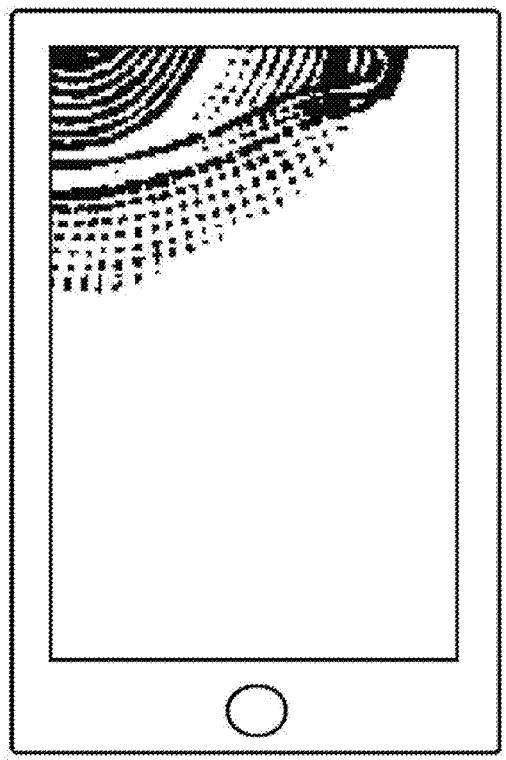

Referring to FIG. 5 in conjunction with FIG. 1, it can be seen that the various display screens 14 of the cell phones 12 of the participating crowd can be used as pixels to create a large digitized display. The images are synchronized and can be altered to display video images over a wide area, wherein the overall image size would be the overall area occupied by the participating system users 10.

Figure 6:
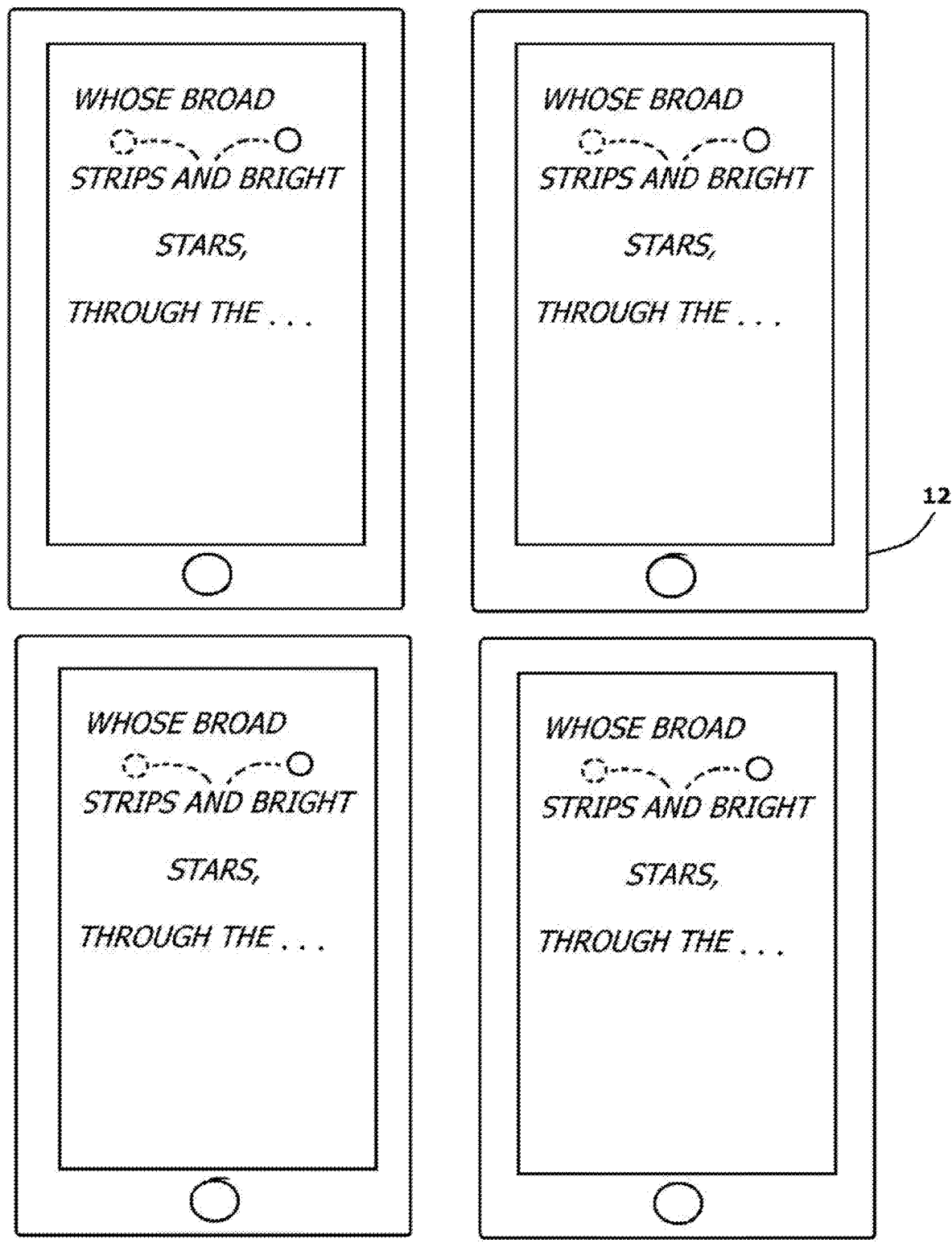
FIG. 6 shows an array of four cell phones prompting synchronized responses.

Referring to FIG. 6 in conjunction with FIG. 1, it can be seen that the executable program can cause instructions, lyrics, and/or music to appear and/or be played on each mobile cellular device 12 in full synchronization. This would enable the system users 10A, 10B to sing together, pray together, dance together, or otherwise perform synchronized activities without concern for the physical location of the system users 10. Accordingly, the synchronized session activity can be maintained even if the participating system users 10 are widely geographically dispersed. For example, a prayer vigil can be established, where people all over the world pray the exact same prayer in perfect synchronization.

For some session activities, the placement of each of the system users 10 in a crowd must be known. For example, if the display screens 16 of the mobile cellular devices 12 are being used as pixels to create a larger effect or display, the position of each mobile cellular device 12 with respect to the others needs to be known. In such a scenario, a system user 10 may have to enter a stadium seat number or similar locator into the mobile cellular device 12 when they accept the session activity offered. In outdoor locations, each mobile cellular device 12 may receive a different executable program depending upon the GPS coordinates detected by the remote cellular device 12.

Additionally, the session activity can be coordinated with broadcasts, such as television broadcasts, radio broadcasts, internet broadcasts, and the like. The system and software can take into account transmission delays to different geographical areas. In this manner, the response from system users 10A, 10B can be synchronized even though the broadcast to the system users 10A, 10B is not.

The software application 20 can also help to physically congregate system users 10A, 10B together prior to triggering an event. The system and software can read data from user devices that have GPS and/or cellular location abilities. The location data can be shown to all subscribing system users 10A, 10B on a mapping interface. This enables users to view the locations of user congregations so that they can join with the congregation.

The executable program for a session activity enables any primary user 10A to send images, videos, audible tracks, texts and the like to secondary users 10B. However, the data sent cannot be saved or reproduced. Rather, it is utilized by the software application 20 when the session activity is triggered. The time that the session activity is triggered is determined by the primary user 10A who sends the data, not by the secondary user 10B who receives the data.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. A daisy chain network system for executing commands in a synchronized manner at an execution time, said system comprising:
a plurality of mobile cellular devices that are each running a common software application and that each have a systems clock, wherein said common software application causes said plurality of mobile cellular devices to generate local personal data networks that interlink and form a daisy chain network;
wherein said plurality of mobile cellular devices include a primary mobile cellular device and at least one secondary mobile cellular device, wherein said primary mobile cellular device receives said executing commands and disseminates said executing commands to said at least one secondary mobile cellular device through said daisy chain network; and
wherein said systems clock of said primary mobile cellular device is updated with a time value when running said common software application, wherein said primary mobile cellular device updates said at least one secondary mobile cellular device with said time value through said daisy chain network to provide time synchronization for when said execution time occurs among said plurality of mobile cellular devices.

2. The system according to claim 1, wherein each of said plurality of mobile cellular devices has a display screen, a camera flash, and an internal vibration mechanism.

3. The system according to claim 2, wherein said executing commands control lighting said display screen.

4. The system according to claim 2, wherein said executing commands control flashing said camera flash.

5. The system according to claim 2, wherein said executing commands control said internal vibration mechanism.

6. The system according to claim 1, wherein said executing commands are selected from a menu of possible executing commands presented on said primary mobile cellular device.

7. The system according to claim 1, wherein said primary mobile cellular device downloads said executing commands from a remote source via a cellular network.

8. A daisy chain network system for executing commands in a synchronized manner at an execution time, said system comprising:
a server accessible through a cellular network, wherein said executing commands are obtainable from said server;
a first mobile cellular device that obtains said executing commands from said server through said cellular network, wherein said first mobile cellular device has a systems clock that is updated with a time value by said cellular network, and wherein said first mobile cellular device broadcasts said executing commands in a first local personal data network generated by said first mobile cellular device;
a plurality of secondary mobile cellular devices that are interlinked by UHF radio signals to each other, wherein at least one of said plurality of secondary mobile cellular devices is interlinked with said first local personal data network of said first mobile cellular device forming a daisy chain network, wherein said executing commands are disseminated through said daisy chain network, and wherein said first mobile cellular device updates said plurality of secondary mobile cellular devices with said time value through said daisy chain network to provide time synchronization for when said execution time occurs.

9. The system according to claim 8, wherein each of said plurality of secondary mobile cellular devices has a display screen, a camera flash, and an internal vibration mechanism.

10. The system according to claim 9, wherein said executing commands control lighting said display screen.

11. The system according to claim 9, wherein said executing commands control flashing said camera flash.

12. The system according to claim 9, wherein said executing commands control said internal vibration mechanism.

13. The system according to claim 9, wherein said executing commands are selected from a menu of possible executing commands presented to said first mobile cellular device by said server.

* * * * *